United States Patent Office 3,475,401
Patented Oct. 28, 1969

3,475,401
CHLORINATION OF POLYETHYLENE
Shemayahu Ben-Moshe, Leonard Marshall Shorr, and Noah Sofer, Haifa, Israel, assignors to Israel Mining Industries-Institute for Research and Development, Haifa Bay, Israel, an Israeli company and Israel Petrochemical Enterprises Ltd., Haifa Bay, Israel, an Israeli company
No Drawing. Filed Nov. 7, 1966, Ser. No. 592,290
Claims priority, application Israel, Nov. 25, 1965, 24,680
Int. Cl. C08f 27/03
U.S. Cl. 260—94.9                                    4 Claims

ABSTRACT OF THE DISCLOSURE

Chlorination of powdered high pressure produced polyethylene by prechlorinating at a temperature up to 65° C. and a chlorine concentration in the feed gas of not above 25% and then chlorinating the prechlorinated product at a higher reaction temperature up to 130° C. and a chlorine concentration in the feed gas from 25–100% until the chlorinated product has the desired chlorine content.

---

The present invention concerns the chlorination of powdered polyethylene in the solid state.

As is known the properties of polyethylene may be modified and improved by chlorination and various processes for the chlorination of polyethylene have already been suggested. Thus, for example, it is known to chlorinate polyethylene in solution. This method, however, involves serious problems in the recovery of the solvents after the chlorination. Also in view of the viscosity of the solution it is difficult to achieve a homogeneous dispersion of the chlorine in the reaction mixture so that the reaction rate is rather low.

It is also known to chlorinate polyethylene in aqueous or non-aqueous suspension. However, it has been observed that in this process the polyethylene is as a rule only block-chlorinated, that is, only the amorphous zones are chlorinated while the crystalline zones remain unaffected. The products obtained in this manner are as a rule rigid and brittle and unstable towards heat and light.

It has furthermore already been suggested to chlorinate polyethylene in bulk. However, here again it has been observed that there occurs mainly block-chlorination and that it is difficult to regulate the chlorination so as to obtain stable chlorinated polyethylenes of uniform structure. In order to accomplish a uniform chlorination along the polymer chain in both the amorphous and crystalline zones it has been suggested to apply relatively drastic conditions of temperatures and $Cl_2$ concentration in the feed gas. However, in this process there exists the danger of the polyethylene being fused in a runaway reaction. This applies in particular to low-density high-pressure polyethylene which has a relatively low softening point.

In order to overcome these difficulties it has further been suggested to carry out the reaction in the presence of antistatic agents, such as for example quaternary ammonium salts, dodecyl dimethyl ammonium chloride and the like. However, in this manner the product becomes contaminated with the antistatic agent which is used in a relative proportion of up to 5% by weight, so that additional treatment such as, for example, solvent extraction is required for its removal.

It has further been suggested to carry out the chlorination in two stages, in the first of which about 20% by weight of chlorine is introduced into the polyethylene by bulk chlorination while in the second stage the product of the first stage is dissolved in perchloro ethylene and the chlorination is continued at 116° C. to obtain the desired randomly chlorinated product. However, this second stage is actually a solution-chlorination involving the above referred to drawbacks and difficulties.

The invention consists in a process for the chlorination of powdered high-pressure polyethylene in the solid state wherein the chlorination is started at a reaction temperature not exceeding 65° C. and with a chlorine concentration in the feed gas not exceeding 25%, then in the course of chlorination the temperature is raised, if desired, up to 130° C., and the chlorine concentration in the feed gas is raised to within the range from 25 to 100% and the chlorination is continued until the product has the desired chlorine content.

In this specification, including the claims, all indications of percentage of chlorine in the feed gas in the process according to the invention are by volume, and all indications of percentage of chlorine in the chlorinated product are by weight.

If desired the process according to the invention may be carried out in a single stage in the course of which both the temperature and the chlorine concentration in the feed gas are raised. While from the point of view of equipment and handling such a procedure is of advantage it may in many cases be difficult properly to control the reaction conditions in this process.

Therefore, in accordance with another embodiment of this invention, the chlorination is carried out in two stages, in the first of which the polyethylene is chlorinated at a temperature not exceeding 65° C. and with a chlorine concentration in the feed gas not exceeding 25% up to a chlorine content of the product of 3–15%, and in the second stage both the temperature and chlorine concentration in the feed gas are raised.

During the second stage the chlorine concentration in the feed gas may be 50% or even higher.

As the chlorine concentration in the polymer increases the polymer becomes less susceptible to runaway reaction and therefore an increase of the temperature and the chlorine concentration in the feed gas at this stage will not have the detrimental effect that may result when the same conditions are applied from the outset.

In accordance with the invention it is possible to chlorinate all the various different types of high-pressure polyethylene, that is the low-density, medium-density and high-density types. It is moreover possible by a suitable selection of the temperatures and chlorine concentrations during the several stages to produce at will either amorphous-random-chlorinated or crystalline-block-chlorinated products. Moreover either of these types of chlorinated product may be produced with a wide range of chlorine contents. Turn the invention enables to obtain a broad range of chlorinated polyethylenes with different properties.

Quite generally it may be stated that where in accordance with this invention the reaction temperature during the end phase is between 50 to 90° C. and the chlorine concentration in the feed gas does not exceed 30%, the product is block-chlorinated. Where, on the other hand, the temperature during the end phase is higher than 90° C. and the chlorine concentration in the feed gas is above 30% the product is random-chlorinated. The end phase in the two-stage embodiment is the second stage.

It is one of the great advantages of this invention that for given temperatures and chlorine concentrations during the various reaction stages and a given duration of the chlorination the nature of the product obtained is fully reproducible.

It has been found that in many cases better results are obtained when the actual chlorination is carried out under UV irradiation of a wavelength within the range of 3,200 to 4,000 A.

The invention is illustrated by the following examples without being limited thereto:

EXAMPLE 1

100 g. of powdered low-density high-pressure polyethylene (d=0.918 melt flow index 1.8 and molecular weight about 32,000) with a particle size of −30+200 mesh (Tyler Standard Sieve) were chlorinated in an 800 ml. rotary Pyrex flask illuminated by means of an ultraviolet light source of 125 watts. Gaseous HCl was used as a diluent of the chlorine gas. In the first stage the chlorination was conducted for 1 hour, the chlorine concentration of the feed gas being about 22% until the temperature reached 64° C., and after the end of one hour the chlorine concentration of the gas was increased to 55% and the chlorination was continued for another 1½ hours; the spontaneous temperature rise was controlled so that the temperature rose gradually to 122° C.

The final product contained 41.6% Cl and had an amorphous character as revealed by the absence of an endothermic peak below 150° C. in its differential thermal analysis (DTA).

EXAMPLE 2

100 g. of powdered low-density high-pressure polyethylene (d=0.922, melt flow index 0.25 and molecular weight about 48,000) with a particle size of −30+200 mesh were chlorinated in the same apparatus as in Example 1. Nitrogen was used as a diluent of the chlorine gas. The reaction conditions in the several stages were as follows:

| Stage No. | Percent Cl in feed gas | Temp., °C. | Time, minutes |
| --- | --- | --- | --- |
| 1 | 10 | 60 | 60 |
| 2 | 17 | 65 | 15 |
| 3 | 30 | 75 | 30 |
| 4 | 45 | 105 | 75 |

The final product (obtained after three hours) contained about 30% of chlorine and had a small-crystalline character (a peak of only 0.3 cm.²/25 mg. being measured by DTA in comparison with 1.1 cm.²/25 for the initial polyethylene).

EXAMPLE 3

20 g. of powdered low-density high-pressure polyethylene (d=0.916 with a melt flow index of 15.1–25 and molecular weight of about 24,000) having a particle size of −100+200 mesh were chlorinated in an apparatus like that used in Example 1. Nitrogen was used as a diluent of the chlorine gas. After 15 minutes of chlorination with a feed gas containing 11% Cl at temperatures up to 60° C., a product containing 13.5% of $Cl_2$ was obtained. The product at this stage had a crystalline character as revealed by DTA and IR spectrum studies. Further chlorination of this product with a feed gas containing 45% of $Cl_2$ up to temperatures of 115° C. for 2½ hours yielded an amorphous product containing 38.7% of Cl.

EXAMPLE 4

100 g. of powdered low-density high-pressure polyethylene (melt flow index 22, density 0.916) with a particle size −50+200 mesh, were chlorinated in an apparatus like that used in Example 1. Nitrogen was used as a diluent of the chlorine gas. After 15 minutes of chlorination with a feed gas containing 12% of Cl at temperatures up to 60° C., a product containing 24% of Cl was obtained. The product revealed the same DTA response as did the original polyethylene (the endothermic peak measured by DTA in both cases being 0.6 cm.²/25 mg.). This product was further chlorinated for one hour at 90° C. with a feed gas containing 30% of $Cl_2$ whereby a final product that contained 30.3% of $Cl_2$ and had a DTA peak at 0.5 cm.²/25 mg. was obtained. The degree of crystallinity of this product was thus only slightly lower than that of the starting material.

EXAMPLE 5

The same kind of polyethylene and the same apparatus as used in Example 4 were employed in this example, and nitrogen was used as a diluent of the chlorine gas. The chlorinaion was conducted for 15 minutes, the chlorine percentage in the feed gas was increased rapidly to 45% whilst the temperature was permitted to reach 115° C. The final product contained 24% of Cl and had an amorphous character as revealed by DTA analysis in contrast to the crystalline character of the product obtained in accordance with Example 4.

EXAMPLE 6

100 g. of powdered high-pressure medium-density polyethylene (d=0.927, molecular weight 48,000, melt flow index 22) was chlorinated in an apparatus consisting of a coarse sintered glass filter with a 22 mm. diameter plate and illuminated by means of a fluorescent lamp. Nitrogen was used as a diluent of the chlorine gas. The reaction conditions in the several stages were as follows:

| Stage No. | Percent Cl in feed gas | Temp., °C. | Times minute, |
| --- | --- | --- | --- |
| 1 | 25 | 57 | 5 |
| 2 | 25 | 90 | 90 |
| 3 | 55 | 95 | 285 |

The final product (obtained after about 6¼ hours) contained 50.6% of Cl and had an amorphous character as shown by DTA analyses.

We claim:

1. Process for the chlorination in the solid state of powdered high-pressure produced polyethylene by means of chlorine-containing gas, comprising pre-chlorinating at a reaction temperature within a range up to 65° C. and with a chlorine concentration in the feed gas within a range up to 25% until a pre-chlorinated product is obtained which is not susceptible to runaway reaction during subsequent chlorination at a reaction temperature within a range up to 130° C. and a chlorine concentration in the feed gas within the range from 25–100%, then chlorinating the pre-chlorinated product at a higher reaction temperature within a range up to 130° C., the chlorine concentration in the feed gas being higher than in the pre-chlorinating step and within the range from 25% to 100% and the chlorination is continued until the chlorinated product has the desired chlorine content.

2. Process according to claim 4, characterized in that the pre-chlorination and chlorination steps are carried out in a single stage and the temperature and chlorine concentration in the feed gas are progressively raised from the pre-chlorination values to the final chlorination values.

3. Process according to claim 4, characterized in that the pre-chlorination and chlorination steps are carried out in two stages, in the first of which the polyethylene is pre-chlorinated until a chlorine content of the pre-chlorinated product of 3–15% has been achieved.

4. The product obtained by the process of claim 1.

References Cited

UNITED STATES PATENTS 2,913,447 1/1957 Hoerger _____ 260—94.9
3,227,781 1/1966 Klug et al. _____ 260—897

JOSEPH L. SCHOFER, Primary Examiner

R. A. GAITHER, Assistant Examiner

UNITED STATES PATENT OFFICE

CERTIFICATE OF CORRECTION

Patent No. 3,475,401   October 28, 1969

Ben-Moshe et al.

It is certified that error appears in the above identified patent and that said Letters Patent are hereby corrected as shown below:

Column 2, line 55, "Turn" should read -- Thus --. Column 4 line 56, "4" should read -- 1 --; line 61, "4" should read -- 1 --.

Signed and sealed this 17th day of February 1970.

(SEAL)
Attest:

Edward M. Fletcher, Jr.  WILLIAM E. SCHUYLER, JR.
Attesting Officer  Commissioner of Patents